United States Patent
Mouri

(12) 
(10) Patent No.: US 6,172,162 B1
(45) Date of Patent: *Jan. 9, 2001

(54) FLUORINE CONTAINING ELASTOMERIC SEALING COMPOSITION AND SEALANT

(75) Inventor: Junsaku Mouri, Tokyo (JP)

(73) Assignee: Morisei Kako Co., Ltd. (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/839,100

(22) Filed: Apr. 23, 1997

Related U.S. Application Data

(63) Continuation-in-part of application No. PCT/JP96/02406, filed on Aug. 28, 1996.

(30) Foreign Application Priority Data

Aug. 30, 1995 (JP) .................................................. 7-222017

(51) Int. Cl.[7] .............................. C08L 27/18; C08L 27/22
(52) U.S. Cl. ........................ 525/199; 525/200; 525/326.3
(58) Field of Search ..................................... 525/200, 199

(56) References Cited

U.S. PATENT DOCUMENTS

| | | | | |
|---|---|---|---|---|
| 5,229,461 | * | 7/1993 | Saitoh | 525/200 |
| 5,459,202 | * | 10/1995 | Martinez | 525/200 |
| 5,461,107 | * | 10/1995 | Amin | 524/495 |
| 5,473,018 | * | 12/1995 | Namura | 525/200 |
| 5,502,097 | * | 3/1996 | Saito | 524/389 |

FOREIGN PATENT DOCUMENTS

| | | |
|---|---|---|
| 0607457 | 7/1994 | (EP) . |
| 62171920 | 1/1989 | (JP) . |
| 6483357 | 10/1990 | (JP) . |
| 9502634 | 1/1995 | (WO) . |

OTHER PUBLICATIONS

JA 61–72204, Mar. 28, 1986.
European Search Report, The Hague, Sep. 30, 1998, Examiner De Los Arcos, E.

* cited by examiner

*Primary Examiner*—Christopher Henderson
(74) *Attorney, Agent, or Firm*—Hedman, Gibson & Costigan, P.C.

(57) ABSTRACT

A sealing composition which can keep strength necessary for a sealant and can be reduced a content of eluted metal and a sealant for an etching apparatus made from the sealing composition. The composition is prepared by blending a fluorine-containing elastomer containing a repeating unit derived from fluoroolefin and a repeating unit derived from perfluoroalkyl vinyl ether as a main component and 5–50 percent by weight of fluororesin powder. The content of eluted metal in the cured composition is not to more than 8 ppb.

4 Claims, No Drawings

FLUORINE CONTAINING ELASTOMERIC SEALING COMPOSITION AND SEALANT

The present application is a continuation-in-part to International Application No. PCT/JP96/02406 filed Aug. 28, 1996 and claims priorities to Japanese Application Ser. No. Hei-222017.

BACKGROUND OF THE INVENTION AND RELATED ART STATEMENT

The present invention relates to a sealing composition and a sealant, and more particularly to the sealant which is used preferably for an etching apparatus which is used in the field of semiconductor and liquid crystal display devices.

With the miniaturization and high integration of semiconductor devices and with the increase in the size of liquid crystal display devices and sophistication thereof, dry etching is used as a key technology for miniaturizing the semiconductor devices and sophisticating the liquid crystal display devices. That is, replacing wet etching, dry etching has become increasingly important as a technique of processing fine lines and thin film transistors of the liquid crystal display devices.

Dry etching is classified into reactive plasma etching which is performed, utilizing only chemical reactions of active particles in plasma generated by applying a high-frequency electric field to gas introduced into a chamber; unreactive ion etching which is performed, utilizing only sputtering action caused by ions accelerated by an electric field; reactive sputtering etching which is performed in combination of the reactive plasma etching and the unreactive ion etching. In order to perform the above etching method, the following etching apparatuses have been developed: a plasma etching apparatus, a reactive ion etching apparatus, a reactive ion beam etching apparatus, a sputtering etching apparatus, and an ion beam etching apparatus. Further, a multi-chamber system for successive processing has been developed.

In the etching process which is carried out using the above-described etching apparatuses, there occur $V_{th}$ shifts, leaks, increase in the resistance of contacts, corrosion of Al wiring all due to the presence of heavy metals and contamination due to the adherence of polymer to parts of the etching apparatuses, thus causing the deterioration in the quality of semiconductor devices, substrates of liquid crystal display devices, and the deterioration in the yield of product.

Therefore, in order to maintain the quality of the semiconductor devices and that of the substrates of liquid crystal display device, the etching apparatuses are checked and repaired periodically. Normally, the checking and repairing time is determined by the characteristics, strength, and the like of sealants such as a gate valve sealant and a peripheral sealing material. That is, metal ions eluted from sealants affects the yield greatly. This tendency is outstanding in the ion etching apparatus required to be operated in pressure-reduced atmosphere.

The following sealing compositions are known.

A copolymer consisting of tetrafluoroethylene, perfluoromethylperfluorovinyl ether, and monomer having curing portions (disclosed in Examined Japanese Patent Public No. Hei4-81609); and a copolymer containing at least one kind of unsaturated compounds having the property of ethylene and fluorovinyl ether (disclosed in Examined Japanese Patent Publication No. Hei5-63482).

Sealants such as O-rings, peripheral sealants, and the like formed by molding the above-described copolymers containing fluoroalkyl vinyl ether type do not have the high strength requirements of the etching apparatus. It is possible to improve the strength of the above-described copolymers by adding carbon black thereto, but the sealants formed thereof are electrically conductive and thus cracked in the plasma etching apparatus. In order to solve the above-described problems, a sealant containing silica powder used as a filler has been developed. But a lot of a content of metals, especially, a lot of a content of barium is eluted from the sealant, which necessitates checking/repairing of the etching apparatus at short intervals. Thus, the yield of semiconductor devices and substrates of liquid crystal display devices cannot be improved.

Further, the conventional sealant has a problem that it is in capable of maintaining its initial characteristics for a long time when it is used in a high energy-consuming environment, with the recent remarkable progress in the performance of the etching apparatus.

SUMMARY OF THE INVENTION

The present invention has been made to solve the above-described problems. Accordingly, it is an object of the present invention to provide a sealing composition which is formed into a sealant and maintains its strength and initial characteristic even though the sealant formed thereof is used in a high energy-consuming environment and which can be reduced the elution of metal.

It is another object of the present invention to provide the sealant which is used for an etching apparatus and capable of maintaining its strength and can be reduced the elution of metal.

The sealing composition on the present invention comprises a fluorine-containing elastomer comprising a repeating unit derived from a fluoroolefin and a repeating unit derived from a perfluoroalkyl vinyl ether and 5–50 percent by weight of a fluororesin powder, wherein a content of metal eluted from the sealing composition after curing is not more than 8 ppb.

The fluorine-containing elastomer consists essentially of a repeating unit derived from a tetrafluoroethylene, a perfluoroalkyl vinyl ether, and a fluoroolefin excluding the tetrafluoroethylene or a olefin.

The fluororesin powder is selected from at least one powder of the group consisting of a polytetrafluoroethylene, a tetrafluoroethylene and hexafluoropropylene copolymer, a tetrafluoroethylene and perfluoroalkoxy copolymer, a ethylene and the tetrafluoroethylene copolymer, a ethylene and chlorotrifluoroethylene copolymer, a polychlorotrifluoroethylene, a polyvinylidene fluoride, a polyvinyl fluoride and a vinylidene fluoride type copolymer, and wherein the average diameter of the fluororesin powder have 0.2–50 $\mu$m.

Another sealing composition on the present invention comprises an elastomer and 5–50 percent by weight of the fluororesin powder, wherein the elastomer comprises 100 parts by weight of the fluorine-containing elastomer comprising a repeating unit derived from a fluoroolefin and a perfluoroalkyl vinyl ether and 5–200 parts by weight of a polymer which is selected from at least one of the group consisting of a vinylidene fluoride and hexafluoropropylene copolymer, a vinylidene fluoride, hexafluoropropylene and tetrafluoroethylene copolymer, a propylene and tetrafluoroethylene copolymer, and a fluorosilicone polymer.

The content of metal eluted from the composition is not more than 8 ppb. The fluororesin powder consists of the above-described fluororesin powder.

The sealant for etching apparatus of the present invention is obtained by molding the above-described sealing composition which comprises the fluorine-containing elastomer having a repeating unit derived from a fluoroolefin and a perfluoroalkyl vinyl ether, and 5–50 percent by weight of the fluororesin powder. The content of metal eluted from the sealant after curing is not more than 8 ppb. The hardness is in a range of 50–90°.

Another sealant of the present invention is obtained by molding the above-described another sealing composition. The hardness of the sealant is in a range of 50–90°. The content of metal eluted from the sealant after curing is not more than 8 ppb.

Because the sealing composition of the present invention consists of the above-described substances and does not contain the conventional inorganic filler, it maintains the strength and does not allow the elution of much content of metal after curing. Therefore, the composition can be preferably used as a sealant of semiconductor devices and liquid crystal display devices, thus contributing to the production of quality-improved substrates of ULSI, VLSI, TFTLCD.

The sealant for etching apparatus of the present invention allows the checking/repairing of the etching apparatus to be made at long intervals, thus improving the yield of semiconductor devices and substrates of liquid crystal display device.

DESCRIPTION OF THE PREFERRED EMBODIMENTS

The fluorine-containing elastomer of the present invention contains of the fluorine-containing elastomer containing the repeating unit derived from fluoroolefin and the repeating unit derived from perfluoroalkyl vinyl ether as the main component. The repeating unit derived from fluoroolefin is expressed by a formula (I) shown below:

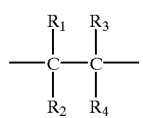

(I)

where $R_1$, $R_2$, $R_3$ and $R_4$ are selected from hydrogen, fluorine, chlorine, alkyl group, alkyl group fluoride, and alkoxyl group fluoride. The repeating unit contains fluorine or alkyl group fluoride as its essential component. Of the above substances, tetrafluoroethylene in which $R_1$, $R_2$, $R_3$ and $R_4$ consist of fluorine is most favorably used in combination with fluorine-contained resin to form the sealant for etching apparatus.

The repeating unit derived from perfluoroalkyl vinyl ether is expressed by a formula (II) shown below:

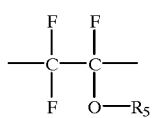

(II)

where $R_5$ indicates perfluoroalkyl group, alkyl group, perfluoroalkyl ether group, and cyanoperfluoroalkyl group each having 1–6 carbon atoms. Preferably, 50–95 mole percent of fluoroolefin and 5–50 mole percent of perfluoroalkyl vinyl ether are mixed with each other.

Preferably, the fluorine-containing elastomer contains at least 40 percent by weight of the elastomer containing the repeating unit derived from fluoroolefin and that derived from perfluoroalkyl vinyl ether.

That is, the fluorine-containing elastomer can consist of the repeating unit derived from fluoroolefin and that derived from perfluoroalkyl vinyl ether. The fluorine-containing elastomer having this composition can be reduced a content of metal after curing.

In order to improve the heat resistance of the fluorine-containing elastomer and maintain the initial characteristic thereof in the environment in which a high energy is applied, it is preferable for the fluorine-containing elastomer to contain an elastomer capable of curing by a radical as a compounding agent. Such an elastomer includes the polyvinylidene fluorides, polytetrafluoroethylene/propylenes. An elastomer consisting of polyfluorosilicones is also preferable.

As an elastomer having the radical curing and composing sealants capable of improving the above-described characteristics of the fluorine-containing elastomer, the elastomer consisting of the polyvinylidene fluorides is preferable. The elastomer consisting of the polyvinylidene fluorides includes a copolymer of vinylidene fluoride and hexafluoropropylene; and a copolymer of vinylidene fluoride, hexafluoropropylene, and tetrafluoroethylene. In addition to the elastomer consisting of the polyvinylidene fluorides, a polymer consisting of polyfluorosilicons is an elastomer preferable for improving the above-described characteristics.

Another sealing composition of the present invention can be obtained by blending the fluorine-containing elastomer having the repeating unit derived from fluoroolefin and that derived from perfluoroalkyl vinyl ether with an elastomer consisting of the polyvinylidene fluorides, for example. Further, the fluorine-containing elastomer can be obtained by copolymerizing fluoroolefin, perfluoroalkyl vinyl ether, vinylidene fluoride, and hexafluoropropylene. In addition, it is possible to obtain a fluorine-containing elastomer by mixing the fluorine-containing elastomer with a copolymer of fluorosilicone, or by copolymerizing a fluorine-containing monomer with a monomer having siloxane bond.

Favorably, 5–200 parts by weight of the elastomer capable of having the radical curing or 5–200 parts by weight of the polymer consisting of fluorosilicone is mixed with 100 parts by weight of the fluorine-containing elastomer having the repeating unit derived from fluoroolefin and that derived from perfluoroalkyl vinyl ether. More favorably, 5–150 parts by weight of the former is mixed with the latter. In order to form the above-described fluorine-containing elastomer by copolymerization, monomers are polymerized in the ratio of forming the same elastomer.

Preferably, these fluorine-containing elastomers are cured by means of organic peroxides which generate peroxy radicals readily in the presence of heat or oxidation-reduction atmosphere. Further, the fluorine-containing elastomer can be cured in combination of an organic peroxide such as dicumyl peroxide, benzoyl peroxide or the like; a polyvalent allyl compound such as triallyl isocyanurate or the like; and a polyvalent allyl compound containing hydroxyl group. This method is preferable for providing a hard sealant.

The following organic peroxides are preferably used to cure the fluorine-containing elastomer: 2,5-dimethyl-2,5-bis (t-butyl peroxy)hexane, 2,5-dimethyl-2,5-bis (t-butyl peroxy) hexyne-3, bis (2,4-dichlorobenzoyl) peroxide, t-butylcumyl peroxide, t-butylperoxybenzene, 1,1-bis (t-butylperoxy)-3,5,5-trimethyl cyclohexane, 2,5-dimethyl hexane-2,5-dihydroxyperoxide, α,α'-bis (t-butylperoxy)-p-diisopropylbenzene, 2,5-dimethyl-2,5-di (benzoylperoxy) hexane, t-butylperoxyisopropyl carbonate.

In addition to triallyl isocyanurate, the following polyvalent allyl compounds can be mixed with the above-described organic peroxides to cure the fluorine-containing elastomer: triallyl cyanurate, triallyl trimellitate, and diallyl phthalate.

The fluororesin powder of the present invention means fine powders of a high polymeric substance containing fluorine in its molecular structure. Preferably, the fluororesin powder does not contain metals. Preferably, the average diameter of the power is 0.2–50 μm.

Preferably, 5–50 percent by weight of fluororesin powder is contained in the cured elastomer, namely, the sealing composition. The sealant formed by the sealing composition containing the fluororesin powder in the above-described range has a preferable degree of elasticity and hardness and the advantage of reducing the elution of metals. The fluorine-containing elastomer containing the fluororesin powder in this mixing range is cured to increase its strength and does not pollute interior parts of an etching apparatus because metals do not elute from the sealant formed by the sealing composition. Thus, the sealant contributes to the increase in the yield of semiconductor devices and substrates of liquid crystal display device.

In the present invention, the content of metal eluted from the sealing composition after curing means the content of metal contained in a 0.6-fold solution of an 50 percent by weight hydrofluoric acid aqueous solution in which a sample whose surface is cleaned with super-pure water is immersed at 24° C. for 72 hours. More specifically, a sealant having a surface area of about 14 cm$^2$ is immersed in 1 kg of the 50 percent by weight hydrofluoric acid aqueous solution at 24° C. for 72 hours. Then, the content of metal contained in a solution of 600 g taken out from 1 kg of the 50 percent by weight hydrofluoric acid aqueous solution is measured.

Favorably, the content of metal eluted from the sealant after curing is not more than 8 ppb.

More favorably, the elution content of these metals, namely, aluminum, barium, cadmium, chromium, copper, iron, magnesium, sodium, zinc, and silicon is not more than 1 ppb respectively.

Preferably, the sealant composition is cured at 150–170° for 5–30 minutes in a primary curing condition and at 170–190° for 2–8 hours in a second curing condition.

The use of the sealant having an advantage of reducing the elution of metal allows the etching apparatus to be durable and improves the quality of semiconductor devices and substrates of liquid crystal display device.

The sealing composition of the present invention can be used as the sealant for use in manufacturing apparatuses which require the reduction of the elution of metals. The manufacturing apparatuses include an etching apparatus and a vacuum evaporator. The sealant of the present invention can be preferably used for the etching apparatus in particular. The etching apparatus includes a plasma etching apparatus, a reactive ion etching apparatus, a reactive ion beam etching apparatus, a sputtering etching apparatus, and an ion beam etching apparatus.

The repeating unit derived from fluoroolefin excluding tetrafluoroethylene or that derived from olefin means fluoroolefin excluding tetrafluoroethylene having $R_1$, $R_2$, $R_3$ and $R_4$ in the formula (I) consist of fluorine, or an ethylene unit or a propylene unit having $R_1$, $R_2$, $R_3$ and $R_4$ consist of hydrogen or alkyl group. Preferably, 5–200 parts by weight of an elastomer having such repeating units is mixed with 100 parts by weight of the fluorine-containing elastomer having the repeating unit derived from fluoroolefin and that derived from perfluoroalkyl vinyl ether. The sealant formed of the mixture of both elastomers maintains the elasticity and hardness preferable for the etching apparatus and so that a content of the elution of metal can be reduced therefrom.

The fluororesin powder which is contained in the fluorine-containing elastomer has 0.5–50 μm in the average diameter thereof so that the sealant maintains the hardness preferable for the etching apparatus and so that a content of the elution of metal can be reduced therefrom.

The hardness of the sealant of the present invention for use in the etching apparatus means the hardness of rubber measured in accordance with JIS K 6301. The sealant having a hardness of 50°–90° is prevented from being deformed and allows the etching apparatus to operate reliably for a long time.

The sealant for etching apparatus means a gate valve sealant and a peripheral sealant which can be used for the plasma etching apparatus, the ion etching apparatus, and the like. The gate valve sealant and the peripheral sealant is O-ring-shaped, rectangular, uncircular or seal packing-shaped.

EMBODIMENT 1

The sealing composition and the sealant were prepared as follows. Daielperflo (trade name; manufactured by Daikin Industry Co., Ltd.) containing a polyvalent allyl compound and peroxide and not containing a filler was used as the fluorine-containing elastomer containing the repeating unit derived from fluoroolefin and that derived from perfluoroalkyl vinyl ether as a main component.

The sealing composition was formed by mixing 70 percent by weight of Daielperflo with 30 percent by weight of polytetrafluoroethylene (average diameter of particle: 10 μm) by means of a rubber roll mill.

The composition was placed in a curing die. Then, it was cured at 160° for 10 minutes in the primary curing condition and at 180° for 4 hours in the second curing condition. As a result, the sealant having a surface area of 14.2 cm$^2$ was obtained.

The content of metal which eluted from the sealant was measured by the following method:

1) The sealant put into a polyethylene container was cleaned three times with super-pure water while it was vibrated. Then, it was cleaned one time in an aqueous solution containing hydrofluoric acid at 5 percent by weight while it was vibrated. Thereafter, it was cleaned again one time with super-pure water by vibrating.

2) The surface-cleaned sealant was put into a polyethylene container of one liter and at 24° C. for 72 hours immersed in one kilogram of an aqueous solution containing hydrofluoric acid at 50 percent by weight.

3) A solution of 600 grams was taken out from 1 kg of the aqueous solution containing hydrofluoric acid at 50 percent by weight. Then, the taken-out aqueous solution was concentrated to 46-fold, and then the concentrated solution as placed on a platinum plate to vaporize and dry solvents. Then, 13 ml of nitric acid having a normality of 0.1 was added to the dried solution. In this manner, a sample for measuring metal was obtained.

4) The content of metal in the sample was measured by a plasma emission-analyzing instrument of induction connection type (ICP).

The measured result in shown in table 1.

EMBODIMENT 2

The sealing composition and the sealant were prepared as follows. A blended elastomer of 100 parts by weight of Daielperflo (trade name; manufactured by Daikin Industry Co., Ltd.) same as Embodiment 1 and 30 parts by weight of a copolymer of vinylidene fluoride and hexafluoropropylene was used as the fluorine-containing elastomer.

The sealing composition was formed by mixing 70 percent by weight of the blended elastomer with 30 percent by weight of a polytetrafluoroethylene (average diameter of powder: 10 μm) by means of a rubber roll mill.

The composition was placed in a curing die. Then, it was cured at 160° for 10 minutes in the primary curing condition and at 180° for 4 hours in the second curing condition. As a result, the sealant having a surface area of 14.2 cm$^2$ was obtained.

EMBODIMENT 3

The sealing composition and the sealant were prepared as follows. A blended elastomer of 100 parts by weight of Daielperflo (trade name; manufactured by Daikin Industry Co., Ltd.) same as Embodiment 1 and 30 parts by weight of a copolymer of vinylidene fluoride, hexafluoropropylene and tetrafluoroethylene was used as the fluorine-containing elastomer.

The sealing composition was formed by mixing 70 percent by weight of the blended elastomer with 30 percent by weight of a polytetrafluoroethylene (average diameter of powder: 10 μm) by means of a rubber roll mill.

The composition was placed in a curing die. Then, it was cured at 160° for 10 minutes in the primary curing condition and at 180° for 4 hours in the second curing condition. As a result, the sealant having a surface area of 14.2 cm$^2$ was obtained.

COMPARATIVE EMBODIMENTS 1 AND 2

The condition of comparative embodiment 1 and 2 was the same as that of the embodiment 1 except that instead of polytetrafluoroethylene, carbon black was used in the comparative embodiment 1, and that instead of polytetrafluoroethylene, silica powder was used in the comparative embodiment 2.

Table 2 shows the measurement results of the elution content of each metal.

TABLE 1

| Eluted metal | Embodiment 1 | Com 1 | Com 2 | Detection Limit |
| --- | --- | --- | --- | --- |
| Aluminum(Al) | ND | ND | ND | 0.21 |
| Barium(Ba) | ND | ND | 24.1 | 0.05 |
| Cadmium(Cd) | ND | ND | ND | 0.15 |
| Chromium(Cr) | ND | ND | ND | 0.21 |
| Copper(Cu) | ND | ND | ND | 0.03 |
| Iron(Fe) | ND | ND | ND | 0.11 |
| Magnesium(Mg) | ND | ND | ND | 0.01 |
| Sodium(Na) | ND | ND | ND | 0.81 |
| Zinc(Zn) | ND | ND | ND | 0.79 |
| Silicon(Si) | ND | ND | 2.6 | 0.37 |

Note: Com indicates comparative embodiment; ND indicates values below limit of detection; and the elution content of metal is expressed by ppb.

The sealant of the embodiment 1 was superior in that the elution content of each metal was less than the limit of detection. The sealant of the embodiment 1 was used for a chamber of a plasma etching apparatus. The result was that the sealant prolonged the interval of the checking/repairing of the plasma etching apparatus to more than three times as long as that required by the plasma etching apparatus, the chamber of which comprises a sealant formed of a composition consisting of the conventional fluorine-containing elastomer mixed with fine silica power.

The sealant of the embodiments 2 and 3 prolonged the interval of the checking/repairing of the plasma etching apparatus to more than three times as long as that required by the plasma etching apparatus, the chamber of which comprised the sealant of the embodiment 1 in a state in which plasma having a density as high as $10^{11}$–$10^{12}$ ion/cm$^3$ was generated at a lower pressure 1–20 mTorr (0.133–2.667 Pa).

A sealant was produced in the same condition as that of the embodiment 1 except that 5 percent by weight or 50 percent by weight of polytetrafluoroethylene powder was used, showed the result similar to the embodiment 1. A sealant was produced in the same condition as that of the embodiment 1 except that the average particle diameter of polytetrafluoroethylene powder was 0.2 μm or 50 μm, showed the results similar to the embodiment 1.

As shown in table 1, the elution content of metal of the sealant of comparative embodiment 1 was similar to that of the embodiment 1. When the sealant of comparative embodiment 1 was used for the plasma etching apparatus, it was cracked and electrically conductive. Therefore, it cannot be applied to the plasma etching apparatus. Barium and silicon was eluted from the sealant of the comparative embodiment 2. Further, the sealant of the comparative embodiment 2 shortened the interval of the checking/repairing of the plasma etching apparatus to less than ⅓-fold of that required in the plasma etching apparatus comprised the sealant of the embodiment 1, thus deteriorating the yield of the semiconductor device and that of the liquid crystal display device.

As apparent from the foregoing description, the sealing composition of the present invention is useful as the sealant of apparatuses for manufacturing semiconductor devices and substrates of liquid crystal display device and contributes to the production of quality-improved substrates of ULSI, VLSI, and TFTLCD.

The sealant of the present invention for use in an etching apparatus allows the etching apparatus to be checked or repaired at a long interval and improves the yield of the semiconductor device and that of the substrates of liquid crystal display device.

What is claimed is:

1. An elastomeric sealing composition for a dry plasma etching apparatus consists essentially of a repeating unit derived from a fluoroolefin and a repeating unit derived from a perfluoroalkyl vinyl ether, polyvalent allyl compounds, peroxides and 5–50 percent by weight of a high polymeric polytetrafluoroethylene powder having an average diameter of 0.2–50 μm, wherein the content of metal eluted from the sealing composition after curing is not more than 8 ppb.

2. A composition according to claim 1, wherein the content of metal eluted for the sealing composition after curing to be immersed in 50% by weight hydrofluoric acid aqueous solution at 24° C. for 72 hours is not more than 8 ppb.

3. A sealant for a dry plasma etching apparatus which consists essentially of the sealing composition according to claim 1.

4. An elastomeric fluorine-containing sealing composition having a fluorine-containing elastomer wherein said fluorine-containing elastomer consists essentially of a repeating unit derived from a fluoroolefin, a repeating unit derived from a perfluoroalkyl vinyl ether and 5–50 percent by weight of a high polymeric polytetrafluoroethylene powder having an average diameter of 0.2–50 µm, wherein not more than 8 ppb of metal may be eluted from the composition after curing.

* * * * *